United States Patent [19]

Gehr, Jr.

[11] Patent Number: 5,860,203
[45] Date of Patent: Jan. 19, 1999

[54] HANDLE REPAIR DEVICE

[75] Inventor: Thomas Y. Gehr, Jr., Northbrook, Ill.

[73] Assignee: ESCO Equipment Service Company, Elk Grove Village, Ill.

[21] Appl. No.: 923,040

[22] Filed: Sep. 3, 1997

[51] Int. Cl.$^6$ .................................................. B23P 19/02
[52] U.S. Cl. ........................... 29/252; 29/255; 29/257; 29/281.6
[58] Field of Search ............................ 29/252, 253, 251, 29/257, 255, 244, 281.1, 281.6

[56] References Cited

U.S. PATENT DOCUMENTS

| | | | |
|---|---|---|---|
| 2,837,814 | 6/1958 | Anderson | 29/252 |
| 3,268,991 | 8/1966 | Beinhaur | 29/255 |
| 3,334,405 | 8/1967 | Cann et al. | 29/257 |
| 3,359,618 | 12/1967 | Murphy | 29/252 |
| 4,544,134 | 10/1985 | Mitchell | 29/252 |
| 4,763,394 | 8/1988 | Decato et al. | 29/252 |
| 5,325,576 | 7/1994 | Henderson | 29/252 |
| 5,680,688 | 10/1997 | Garner | 29/252 |
| 5,692,437 | 12/1997 | Tabain | 29/251 |

*Primary Examiner*—David A. Scherbel
*Assistant Examiner*—Lee Wilson
*Attorney, Agent, or Firm*—Lloyd L. Zickert

[57] ABSTRACT

A handle repair device for removing a broken, damaged, and/or worn handle from the working head of a handle mounted tool such as a sledge-hammer, spike maul, or pick axe. The handle repair device includes a frame for holding the working head of the handle mounted tool and an actuating member mounted in the frame for selectively extending a ram into engagement with the handle in the working head to force the broken handle out of the working head of the tool.

30 Claims, 1 Drawing Sheet

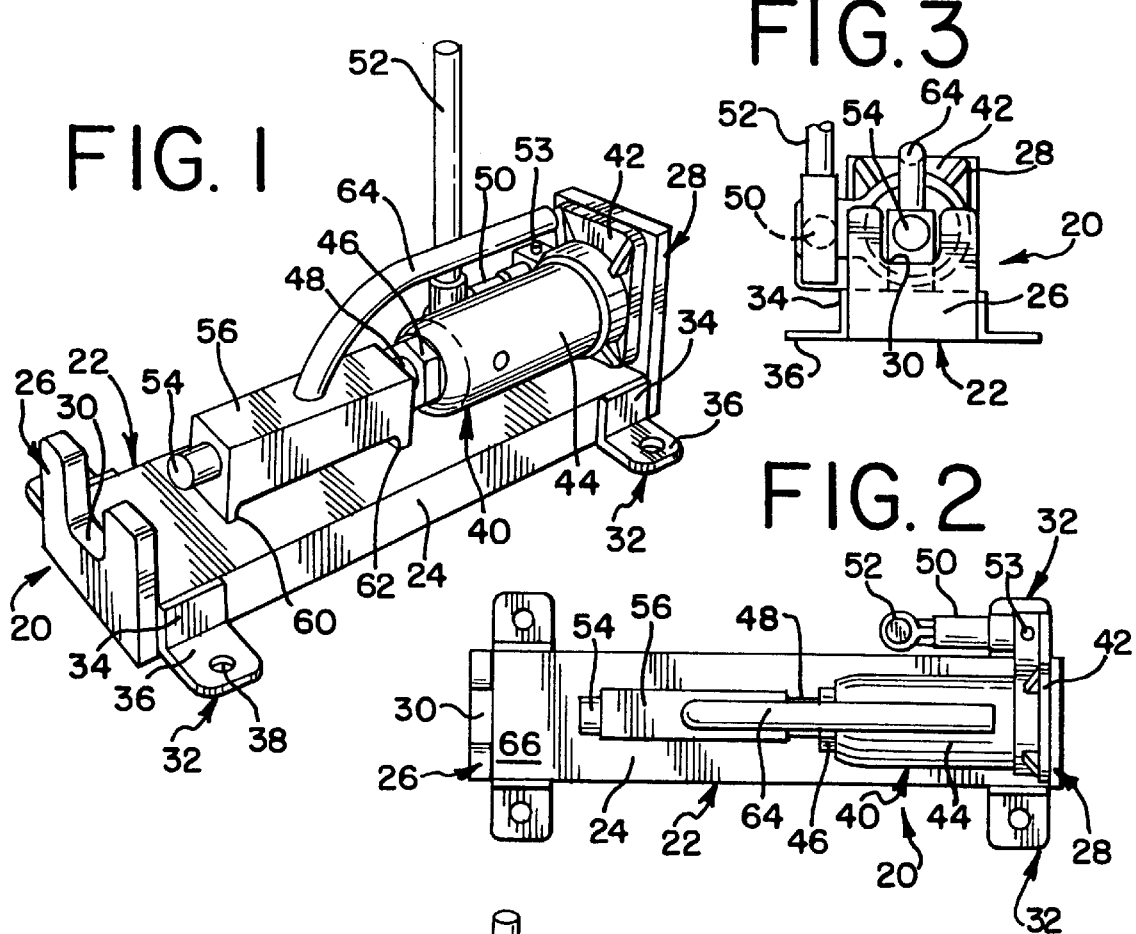
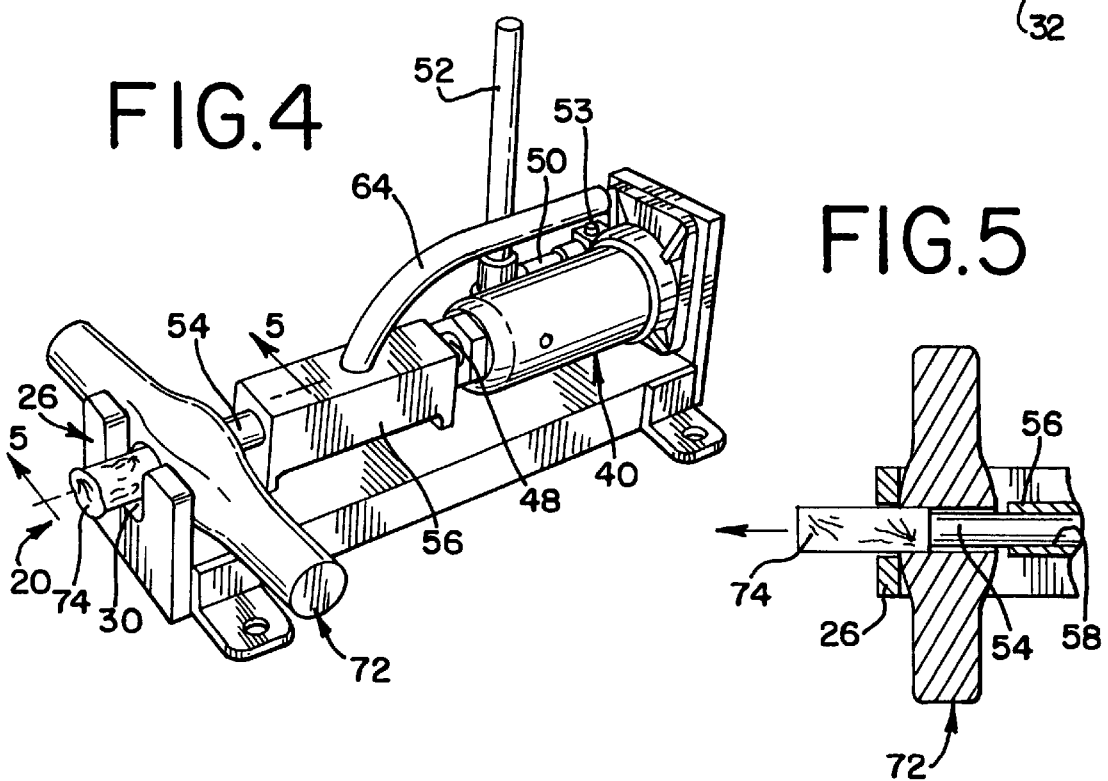

HANDLE REPAIR DEVICE

DESCRIPTION

This invention relates in general to a handle repair device, and more particularly to a handle repair device for removing a broken, damaged, or worn handle from a sledge-hammer, spike maul, pick axe, or other handle-mounted tools.

BACKGROUND OF THE INVENTION

Sledge-hammers, spike mauls, pick axes, and other heavy duty handle-mounted tools are used throughout a variety of industries such as the railroad industry and the construction industry. These tools generally include some type of working head and a handle attached to and extending from the head. In particular, the handle is mounted in a throughbore centrally located in the working head. The handles for such tools are often made of wood, although they could be made of other suitable materials. These tools are subjected to repetitive and extreme forces often resulting in a broken, damaged, and/or worn handle which needs to be replaced by removing the old handle from the working head and replacing it with a new handle.

Heretofore, broken, damaged, and/or worn handles have been removed by hand by sawing, cutting, chiseling, drilling, and/or prying the end of the handle from the central bore in the head. Manually removing handles using such methods has been relatively difficult, time-consuming, and expensive. Moreover, the operation of removing these handles may result in injury caused by the removal tools or from extracted pieces of the handles. Accordingly, there is a need for an quick, economical, and safe apparatus for automatically removing a broken, damaged, and/or used handle from a sledge-hammer, spike maul, pick axe, and other handle-mounted tools.

SUMMARY OF THE INVENTION

The present invention overcomes the above problems in providing a handle repair device for quickly, safely, and automatically removing a broken, damaged, and/or worn handle from a handle-mounted tool such as a sledge-hammer, spike maul, or pick axe. Handle-mounted tools generally include a working head having a transversely extending throughbore centrally positioned in the head. The upper end of the handle is mounted in the throughbore and secured therein by one or more wedges or spikes hammered into the top surface of the upper end of the handle.

The portable or permanently mounted handle repair device of the present invention includes a U-shaped steel frame formed from a base plate and a pair of spaced apart upstanding end plates suitably attached to the base plate. A hand activated actuating member such as a hydraulic bottle jack or hydraulic or air cylinder is longitudinally mounted in the frame between the end plates with its supporting base secured to one of the end plates. A rod or shaft is selectively extendable from the jack in a plane substantially parallel to and suspended above the base plate. An extension ram is attached to the shaft and is journaled in a longitudinally extending guide tube mounted to the base plate adjacent to the jack. A gap is provided between the guide tube and the other end plate. This end plate includes a slot through which the handle moves when it is forced out of the handle-mounted tool. The gap between the guide tube and the slotted end plate is adapted to receive the working head of a handle mounted tool such that the bottom surface of the head is adjacent to the guide tube and the top surface of the head is adjacent to the end plate. A handle is attached to the guide tube for holding the handle repair device during the handle removal process and for lifting and carrying the handle repair device.

Prior to inserting the handle-mounted tool in the handle repair device of the present invention, the handle may be cut down substantially close to the bottom surface of the working head if the handle is not already broken at that point. To remove the remaining part of the handle from the working head of the tool, the head is laid on its side in the gap with its bottom surface facing the guide tube and extension ram and its top surface facing the slotted end plate. The working head is positioned in the frame with the upper surface of the handle substantially aligned with the slot in the end plate and with the bottom surface of the handle substantially aligned with the extension ram. The activating handle on the jack cylinder is activated causing the shaft and extension ram to extend through the guide tube and engage the handle. As the ram is further actuated, it enters the throughbore and forces the upper end of the handle out of the throughbore. The head is held in place by the slotted end plate against the pressure applied by the ram as the handle is pushed out of the throughbore and moves through the slot in the end plate. After the handle is pushed completely out of the working head, the pressure in the actuating member or jack is released by manually opening a release valve, thereby allowing the shaft and ram to retract so that the head may be removed from the handle repair device.

It is therefore an object of the present invention to provide a handle repair device for removing a handle from a handle-mounted tool.

Another object of the present invention is to provide a handle repair device for quickly, safely, and automatically removing a broken, damaged, and/or worn handle from a handle-mounted tool such as a sledge-hammer, spike maul, or pick axe.

Other objects, features and advantages of the invention will be apparent from the following detailed disclosure, taken in conjunction with the accompanying sheet of drawings, wherein like reference numerals refer to like parts.

DESCRIPTION OF THE DRAWINGS

FIG. 1 is a perspective view of the handle repair device of the present invention;

FIG. 2 is top plan view of the handle repair device;

FIG. 3 is an end view of the handle repair device and illustrating the slotted end plate;

FIG. 4 is a perspective view showing the handle repair device and the working head of a spike maul disposed in the frame during the handle removal process; and FIG. 5 is a cross sectional view taken substantially along line 5—5 in FIG. 4 and illustrating the extension ram forcing the upper end of the handle out of the throughbore in the working head of the spike maul.

DESCRIPTION OF THE INVENTION

Referring now to the drawings, and particularly to FIGS. 1 to 3, the handle repair device of the present invention, designated by the numeral 20, is used to remove a broken, damaged, and/or worn handle from a handle-mounted tool such as a sledge-hammer, spike maul, or pick axe. Handle-mounted tools generally include a working head having a transversely extending throughbore therein for receiving the upper end of a handle. The handle is inserted in the bore and secured in the working head by suitable fastening means such as a wedge or spike which is hammered into the top surface of the upper end of the handle to expand the upper end of the handle in the bore. The handle repair device of the present invention quickly, safely, and automatically removes the handle from the working head of the handle-mounted tool.

The handle repair device 20 includes a somewhat U-shaped steel frame 22 having a substantially rectangular base plate or wall 24 and a pair of spaced apart upstanding substantially rectangular end plates or walls 26 and 28 welded to opposite edges of the base plate 24. End plate 26 is somewhat shorter than end plate 28 and includes a relatively wide centrally located U-shaped slot 30 through which the handle moves when it is forced out of the working head of the tool. The edges of the slot 30 may be rounded or smoothed for safety purposes. The frame 22 further includes a plurality of L-shaped mounting brackets 32 having a first section 34 welded to the side edges of the base plate 24 and a second section 36 extending outwardly from the base plate 24. The second section 36 includes at least one hole 38 for facilitating attachment of the frame 22 and the entire handle repair device to a supporting member (not shown) by suitable fasteners. Thus, it should be appreciated that the handle repair device 20 of the present invention may be permanently mounted to a suitable platform or workbench or alternatively may be a used as a portable unit.

A commercially available conventional one or two ton hydraulic bottle jack 40 is longitudinally disposed and mounted or suspended in the frame 22 above the base plate 24 and against the end plate 28 to produce the force for removing a broken handle. The conventional hydraulic bottle jack 40 includes a supporting base 42 welded or otherwise suitable secured to the end plate 28, a hydraulic cylinder 44 extending from the supporting base 42, a cap 46 on end of the cylinder 44 opposite the supporting base 42, a piston (not shown) disposed in and movable in the cylinder 44, and a cylinder rod or shaft 48 connected to the piston and extending outwardly from the cylinder 44 through the cap 46. The hydraulic cylinder 44 is selectively activated by a manual pump 50 attached to the supporting base 42 and the cylinder 44. A suitably shaped actuation handle 52 is connected to the pump 50 to facilitate easy hand actuation of the pump 50 which causes extension of the shaft 48 from the cylinder 44. A manually operated rotatable pressure release valve 53 is attached to the supporting base 42 and the cylinder 44 to release the pressure in the cylinder and allow retraction of the shaft 48 from the cylinder 44.

A shaft extension member or ram 54 is attached to the end of the shaft 48 opposite the piston. The ram 54 may be permanently welded to the shaft or may be adjustably and/or removably secured, by threading or otherwise, to the shaft 48. The ram 54 is sized at least slightly smaller than the throughbore in the working head of the handle-mounted tool. Alternatively sized rams may be attached to the shaft to accommodate various size throughbores. The hydraulic bottle jack 40 thereby functions as an actuating member for selectively extending the shaft extension ram 54. It should be appreciated that other suitable actuating members could be used in conjunction with the present invention. It should also be appreciated that a standard air or hydraulic cylinder that is remotely operated may be used to produce the power for driving the ram. Also, a mechanically operated device could be used to drive the ram.

The extension ram 54 is slidably received in a guide tube 56 disposed adjacent to the jack 40 and mounted to the top surface of the base plate 24. The guide tube 56 is formed from a solid steel substantially rectangular block having a substantially square cross section. The guide tube 56 includes a longitudinally extending cylindrical chamber or aperture 58, as illustrated in FIG. 5, which receives and acts as a guide for the extension ram 54. The guide tube 56 includes two transversely extending spaced apart legs 60 and 62 disposed on the bottom surface of the guide tube which are welded to the base plate 24 for supporting the guide tube 56. A suitably shaped handle 64 is welded to the top surface of the guide tube 64 for holding the handle repair device 20 during the handle removal process and for lifting and carrying the handle repair device. The guide tube 56 is positioned on the base plate and sized to form a suitable gap or space 66 between the guide tube 56 and the slotted end plate 26 for receiving the working head of a handle-mounted tool.

Referring now to FIGS. 4 and 5, a the working head 72 of a spike maul is shown positioned in the handle repair device 20 of the present invention. Prior to inserting the working head 72 of the spike maul in the handle repair device 20, the handle 74 may be cut substantially close to the bottom surface of the working head 72 if the handle is not already broken at that point. The working head 72 is positioned in the gap 66 of the frame 22 between the guide tube 56 and the slotted end plate 26 with one of its side surfaces resting on the base plate 24, its bottom surface adjacent to the guide tube 56, and its top surface adjacent to the slotted end plate 26 such that the handle 74 is aligned in substantially the same plane as the extension ram 54. To remove the handle 74 from the working head 72, the operator places one hand on the guide tube handle 64 and one hand on the actuation handle 50. The operator pumps or activates the actuation handle 50 generating the extension of the shaft 48 from the hydraulic bottle jack 40 and causing the extension ram 54 to engage the handle. As the extension ram 54 is further extended by pumping the actuation handle 50, it enters the throughbore of the working head 72 and forces the upper end of the handle out of the throughbore, as illustrated in FIGS. 4 and 5. The handle moves though the slot 30 as it is pushed out of the working head. The working head is held in place by the slotted end plate 26 against the lateral pressure applied by the ram. After the handle is pushed completely out of the working head, the operator opens the pressure release valve 52 on the hydraulic bottle jack 40 thereby releasing pressure in the cylinder and allowing retraction of the shaft and ram. After the shaft is fully retracted in the cylinder, the working head may be removed from the handle repair device 20 and the handle may be discarded.

The handle repair device of the present invention could be used to remove the a handle from a variety of other tools.

It will be understood that modifications and variations may be effected without departing from the scope of the novel concepts of the present invention, and it is understood that this application is to be limited only by the scope of the appended claims.

The invention is hereby claimed as follows:

1. A handle repair device for removing a handle from a working head of a handle-mounted tool, said handle repair device comprising:
   a frame,
   an actuator attached to the frame, said actuator including a ram, and
   guide means affixed to the frame for guiding said ram,
   whereby the frame is adapted to receive and hold the working head adjacent to the ram and the actuator is selectively activated to drive the ram into engagement with the handle to force the handle out of the working head.

2. The handle repair device of claim 1, wherein the frame includes a base plate and an end plate against which the working head is received and held.

3. The handle repair device of claim 2, wherein the end plate is formed with a slot through which the handle moves as the handle is forced out of the working head by the actuator driven ram.

4. The handle repair device of claim 3, wherein the frame further includes a second end plate attached to the base plate and spaced from the slotted end plate, and the actuator is attached to the second end plate.

5. The handle repair device of claim 4, wherein the actuator includes a hydraulic bottle jack longitudinally disposed in the frame along the base plate.

6. The handle repair device of claim 5, wherein the hydraulic bottle jack includes a supporting base attached to the second end plate.

7. The handle repair device of claim 6, wherein the hydraulic bottle jack includes a cylinder extending from the supporting base, a cap at the end of the cylinder opposite the supporting base, a piston disposed in and movable in the cylinder, a shaft connected to the piston and extending from the cylinder through the cap, a manually operated pump connected to the cylinder, an actuation handle attached to the pump, and a manually operated pressure release valve connected to the cylinder.

8. The handle repair device of claim 7, wherein the ram is attached to the shaft.

9. The handle repair device of claim 2, wherein the frame further includes at least one mounting bracket connected to the base plate.

10. The handle repair device of claim 2, wherein said guide means includes a guide tube attached to the base plate.

11. The handle repair device of claim 10, wherein a handle is attached to the guide tube.

12. The handle repair device of claim 1, wherein the actuator includes a manually operated jack.

13. The handle repair device of claim 12, wherein the jack is hydraulically powered.

14. The handle repair device of claim 12, wherein the actuator includes a manually operated release valve.

15. The handle repair device of claim 12, wherein the jack is air powered.

16. A handle repair device for removing a handle from a working head of a handle-mounted tool, said handle repair device comprising:

frame means for holding the working head, ram means for engaging the handle and forcing the handle out of the working head, guide tube means attached to the frame means for guiding the ram means, and means attached to the frame means and the ram means for selectively actuating the ram means.

17. The handle repair device of claim 16, wherein the actuating means includes a jack.

18. The handle repair device of claim 17, wherein the jack is hydraulically powered.

19. The handle repair device of claim 17, wherein the jack is air powered.

20. The handle repair device of claim 16, wherein the frame means is U-shaped and includes a base plate and first and second spaced apart end plates connected to the base plate.

21. The handle repair device of claim 20, wherein the actuating means is attached to the first end plate.

22. The handle repair device of claim 21, wherein the second end plate is formed with a slot through which the handle moves as the handle is forced out of the working head.

23. The handle repair device of claim 20, wherein the actuating means includes a hydraulic bottle jack attached to the first end plate and the ram means.

24. The handle repair device of claim 23, wherein the hydraulic bottle jack is longitudinally disposed in the frame and spaced from the base plate.

25. The handle repair device of claim 23, wherein the hydraulic bottle jack includes a supporting base, a cylinder extending from the supporting base, a cap at the end of the cylinder opposite the supporting base, a piston disposed in and movable in the cylinder, a shaft connected to the piston and extending from the cylinder through the cap, a manually operated pump connected to the cylinder, an actuation handle attached to the pump, and a manually operated pressure release valve connected to the cylinder.

26. The handle repair device of claim 25, wherein the ram means is attached to the shaft.

27. The handle repair device of claim 16, wherein the frame means includes mounting bracket means for attaching the handle repair device to a supporting member.

28. The handle repair device of claim 16, wherein the guide tube means includes a longitudinally extending cylindrical bore guidably receiving the ram means.

29. The handle repair device of claim 16, wherein the guide tube means includes two transversely extending spaced apart legs attached to frame means.

30. The handle repair device of claim 16, which further includes an outwardly extending guide tube handle attached to the guide tube means.

* * * * *